US012772020B2

(12) United States Patent
Desmet et al.

(10) Patent No.: US 12,772,020 B2
(45) Date of Patent: Oct. 20, 2026

(54) METHOD AND SYSTEM FOR IMPROVING SUBJECTIVE SOUND RENDERING

(71) Applicant: CAE INC., Saint-Laurent (CA)

(72) Inventors: Laurent Desmet, Saint-Laurent (CA); Maxime Ayotte, Saint-Laurent (CA); Marc-André Giguere, Saint-Laurent (CA)

(73) Assignee: CAE INC., Saint-Laurent (CA)

( * ) Notice: Subject to any disclaimer, the term of this patent is extended or adjusted under 35 U.S.C. 154(b) by 194 days.

(21) Appl. No.: 18/595,695

(22) Filed: Mar. 5, 2024

(65) Prior Publication Data

US 2025/0287175 A1 Sep. 11, 2025

(51) Int. Cl.
*H04S 7/00* (2006.01)

(52) U.S. Cl.
CPC .............. *H04S 7/307* (2013.01); *H04S 7/302* (2013.01); *H04S 2400/11* (2013.01)

(58) Field of Classification Search
CPC .......... H04S 7/301; H04S 7/302; H04S 7/307; H04S 2400/11
See application file for complete search history.

(56) References Cited

U.S. PATENT DOCUMENTS 6,091,894 A * 7/2000 Fujita ...................... H04S 1/002 381/17
9,693,132 B2 6/2017 Goossens
2015/0055787 A1 2/2015 Ganeshkumar
2020/0196085 A1* 6/2020 Raft ......................... H04R 3/04
2022/0312140 A1* 9/2022 Desmet .................... H04R 5/02

* cited by examiner

*Primary Examiner* — James K Mooney
(74) *Attorney, Agent, or Firm* — FASKEN MARTINEAU DUMOULIN LLP

(57) ABSTRACT

There is provided a method for generating sound within a predetermined environment, the method comprising: concurrently emitting within the predetermined environment: a pure sinusoidal audio signal from a first location; and a noisy sinusoidal audio signal from a second location, wherein: the first location and the second location are distinct; the pure sinusoidal audio signal and the noisy sinusoidal audio signal have a same frequency; and within the predetermined environment, the pure sinusoidal audio signal emitted from the first location has a first amplitude that is equal to or greater than a second amplitude of any other signal having said frequency and concurrently emitted from at least one of the first location and the second location.

18 Claims, 7 Drawing Sheets

METHOD AND SYSTEM FOR IMPROVING SUBJECTIVE SOUND RENDERING

TECHNICAL FIELD

The present technology relates to the field of sound processing, and more particularly to a method and system for improving subjective sound rendering.

BACKGROUND

Vehicle simulators are used for training personnel to operate vehicles to perform maneuvers for example. As an example, flight simulators are used by commercial airlines and air forces to train their pilots to face various types of situations. A simulator is capable of artificially recreating various functionalities of an aircraft, and of reproducing various operational conditions of a flight (e.g., takeoff, landing, hovering, etc.). Thus, in some instances, it is important for a vehicle simulator to reproduce the internal and external environment of a vehicle such as an aircraft as accurately as possible by providing sensory immersion, which includes reproducing visual effects, sound effects (e.g., acceleration of motors, hard landing, etc.), and movement sensations, among others.

For example, in the case of sound assessment, the location of a microphone to be used for sound tests or calibration is usually important to ensure repeatability such as when running sound Qualification Test Guide (QTG) tests. There are also requirements that certain frequency bands correspond to a certain amplitude, which must be contained within a certain tolerance range. For example, a QTG may require that for a minimum time period of 20 seconds, the average power in a given frequency band must be equal to a predetermined quantity.

Further, arbitrary audio signal variations may influence actions of a user training on the vehicle simulator, Therefore, there is a need for a method and system for improving subjective sound rendering.

SUMMARY

In accordance with a first broad aspect, there is provided a method for generating sound within a predetermined environment, the method comprising: concurrently emitting within the predetermined environment: a pure sinusoidal audio signal from a first location; and a noisy sinusoidal audio signal from a second location, wherein: the first location and the second location are distinct; the pure sinusoidal audio signal and the noisy sinusoidal audio signal have a same frequency; and within a listening area of the predetermined environment, the pure sinusoidal audio signal emitted from the first location has a first amplitude that is equal to or greater than a second amplitude of any other signal having said frequency and concurrently emitted from at least one of the first location and the second location.

In some embodiments, the step of emitting the second audio signal comprises filtering a noisy signal to obtain the noisy sinusoidal audio signal, a first phase of the noisy sinusoidal audio signal being different from a second phase of the pure sinusoidal audio signal.

In some embodiments, the step of filtering of the noisy signal acts as a harmonic resonator having a resonating frequency.

In some embodiments, the step of filtering of the noisy signal is performed using a band-pass filter.

In some embodiments, the band-pass filter has a predetermined bandwidth, and the predetermined bandwidth is sufficiently large to preserve a phase incoherence between the pure sinusoidal audio signal and the noisy sinusoidal audio signal.

In some embodiments, the predetermined bandwidth is about 2 Hz.

In some embodiments, the noisy signal comprises at least one of white noise, pink noise, red noise, brown noise and grey noise.

In some embodiments, a difference between the phase of the pure sinusoidal audio signal and the phase of the noisy sinusoidal audio signal is chosen to be within a predetermined range.

In some embodiments, the step of emitting the noisy sinusoidal audio signal comprises: generating a plurality of sinusoidal audio signals; and combining the plurality of sinusoidal audio signals to obtain the second audio signal.

In some embodiments, the method further comprises: determining that within the listening area of the predetermined environment, of all signals having said frequency and concurrently emitted from the first location and the second location, the one having the greatest amplitude should be emitted from the second location; and in response to the determining, concurrently emitting within the predetermined environment: the noisy sinusoidal audio signal from the first location; and the pure sinusoidal audio signal from the second location, wherein within the listening area of the predetermined environment, the pure sinusoidal audio signal emitted from the second location has a greater amplitude than any other signal having said frequency and concurrently emitted from at least one of the first location and the second location.

In some embodiments, a transfer of the emission of the pure sinusoidal audio signal from the first location to the second location and a transfer of the emission of the noisy sinusoidal audio signal from the second location to the first location are performed gradually in time so as to obtain a transitory phase comprising: a fading out of the pure sinusoidal audio signal and a fading in of the noisy sinusoidal audio signal, at the first location; and a fading in of the pure sinusoidal audio signal and a fading out of the noisy sinusoidal audio signal, at the second location.

In some embodiments, the transfer of the emission of the pure sinusoidal audio signal and the transfer of the emission of the noisy sinusoidal audio signal are performed in an exponential manner.

In some embodiments, the method further comprises estimating the amplitude of the pure sinusoidal audio signal within the listening area and the amplitude of the noisy sinusoidal audio signal within the listening area.

In accordance with another broad aspect, there is provided a system for generating sound within a predetermined environment, the system comprising: at least one processor; and a non-transitory computer program product comprising a storage medium storing computer executable instructions thereon that when executed by the at least one processor cause the at least one processor to: control a first emitter located at a first location for emitting a pure sinusoidal audio signal; and control a second emitter located at a second location for emitting a noisy sinusoidal audio signal, wherein: the first location and the second location are distinct; the pure sinusoidal audio signal and the noisy sinusoidal audio signal have a same frequency; and within a listening area of the predetermined environment, the pure sinusoidal audio signal emitted from the first location has a first amplitude that is equal to or greater than a second amplitude of any other signal having said frequency and concurrently emitted from at least one of the first location and the second location.

In some embodiments, the storage medium stores further computer executable instructions thereon that when executed by the at least one processor cause the at least one processor to: generate a noisy signal; filter the noisy signal to obtain the noisy sinusoidal audio signal, a phase of the noisy sinusoidal audio signal being different from a phase of the pure sinusoidal audio signal; and transmit the noisy sinusoidal audio signal to the second sound emitter.

In some embodiments, a difference between the phase of the pure sinusoidal audio signal and the phase of the noisy sinusoidal audio signal is chosen to be within a predetermined range.

In some embodiments, the noisy signal comprises at least one of white noise, pink noise, red noise, brown noise and grey noise.

In some embodiments, the storage medium stores additional computer executable instructions thereon that when executed by the at least one processor cause the at least one processor to filter the noisy signal using a band-pass filter.

In some embodiments, the band-pass filter has a predetermined bandwidth, and the predetermined bandwidth is sufficiently large to preserve a phase incoherence between the pure sinusoidal audio signal and the noisy sinusoidal audio signal.

In some embodiments, the predetermined bandwidth is about 2 Hz.

In some embodiments, the storage medium stores further computer executable instructions thereon that when executed by the at least one processor cause the at least one processor to: generate a plurality of sinusoidal audio signals; combine the plurality of sinusoidal audio signals to obtain the noisy sinusoidal audio signal; and transmit the noisy sinusoidal audio signal to the second sound emitter.

In some embodiments, the storage medium stores further computer executable instructions thereon that when executed by the at least one processor cause the at least one processor to: determine that within the listening area of the predetermined environment, of all signals having said frequency and concurrently emitted from the first location and the second location, the one having the greatest amplitude should be emitted from the second location; and in response to the determination, concurrently control the first and second emitters for emitting within the predetermined environment: the noisy sinusoidal audio signal from the first location; and the pure sinusoidal audio signal from the second location, wherein within the listening area of the predetermined environment, the pure sinusoidal audio signal emitted from the second location has a greater amplitude than any other signal having said frequency and concurrently emitted from at least one of the first location and the second location.

In some embodiments, the storage medium stores further computer executable instructions thereon that when executed by the at least one processor cause the at least one processor to perform a transfer of the emission of the pure sinusoidal audio signal from the first emitter to the second emitter and a transfer of the emission of the noisy sinusoidal audio signal from the second emitter to the first emitter gradually in time so as to obtain a transitory phase comprising: a fading out of the pure sinusoidal audio signal and a fading in of the noisy sinusoidal audio signal at the first location; and a fading in of the pure sinusoidal audio signal and a fading out of the noisy sinusoidal audio signal at the second location.

In some embodiments, the transfer of the emission of the pure sinusoidal audio signal and the transfer of the emission of the noisy sinusoidal audio signal are performed in an exponential manner.

In some embodiments, the storage medium stores supplementary computer executable instructions thereon that when executed by the at least one processor cause the at least one processor to estimate the amplitude of the pure sinusoidal audio signal within the listening area and the amplitude of noisy sinusoidal audio signal within the listening area.

In accordance with a further broad aspect, there is provided a non-transitory computer program product for generating sound within a predetermined environment, the non-transitory computer program product comprising a storage medium storing computer executable instructions thereon that when executed by a processor cause the processor to: control a first emitter located at a first location for emitting a pure sinusoidal audio signal; and control a second emitter located at a second location for emitting a noisy sinusoidal audio signal, wherein: the first location and the second location are distinct; the pure sinusoidal audio signal and the noisy sinusoidal audio signal have a same frequency; and within a listening area of the predetermined environment, the pure sinusoidal audio signal emitted from the first location has a first amplitude that is equal to or greater than a second amplitude of any other signal having said frequency and concurrently emitted from at least one of the first location and the second location.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
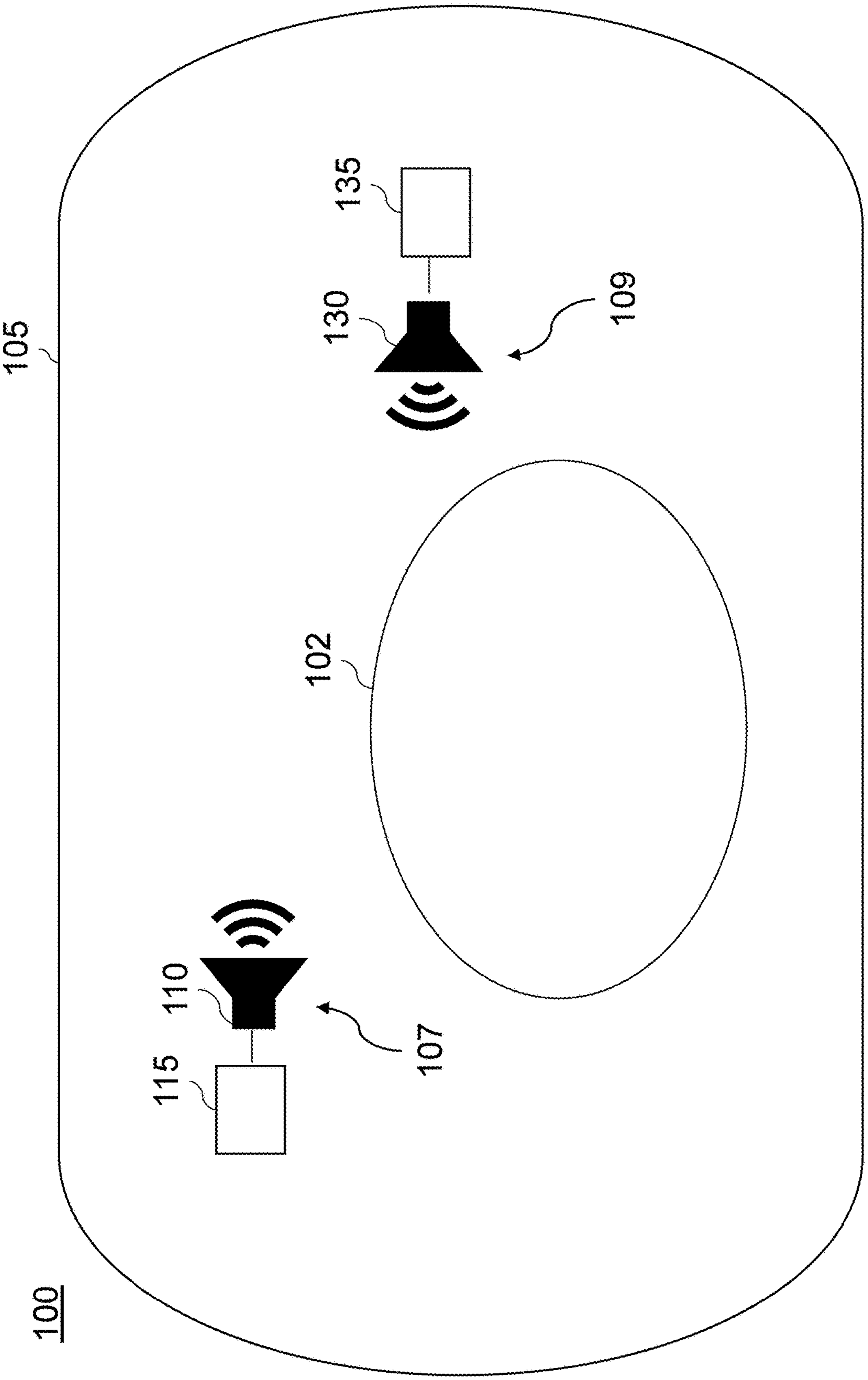
FIG. 1 is a conceptual diagram illustrating an embodiment of a system comprising two sound emitters and a controller for emitting two sound signals and improving subjective sound rendering.

FIG. 1 schematically illustrates one embodiment of a system 100 for emitting sound within a predetermined environment 105 while improving subjective sound rendering.

The system 100 includes a first sound emitter 110 operatively connected to a first controller or playback system 115, a second sound emitter 130 operatively connected to a second controller or playback system 135, and optionally a sound detector (not shown) operatively connected to a signal processor 155. While the illustrated system 100 comprises two controllers 115 and 135 each for controlling a respective sound emitter 110, 130, it will be understood that the system 100 may comprise a single controller or playback system connected to both sound emitters 110 and 130.

The first and second sound emitters 110 and 130 are positioned at different locations within the environment 105 and oriented so as to propagate sound towards a predefined listening area 102 in the predetermined environment 105 where a user of the system 100 is expected to be positioned.

The first controller 115 is configured for transmitting a first sound, acoustic or audio signal to the first sound emitter 110 and the second controller 135 is configured for transmitting a second sound, acoustic or audio signal to the second sound emitter 130, and the first and second audio signals are chosen so as to improve subjective sound rendering at least within the listening area 102 of the environment 105.

In some embodiments, the predetermined environment 105 is a closed space or a semi-closed space such as a vehicle simulator. As a non-limiting example, the vehicle simulator may be a flight simulator, a helicopter simulator, a tank simulator, and the like. In another embodiment, the predetermined environment 105 is an open space.

In some embodiments, the first and second audio signals may reproduce sounds that would be normally heard if a user of the system would be in the device that the predetermined environment 105 simulates. For example, when the predetermined environment 105 corresponds to an aircraft simulator, the first and second sound emitters 110 and 130 may be positioned on the left and right sides of a seat to be occupied by a user of the aircraft simulator and the first sound emitter 110 may be used to propagate the sound generated by a left engine of an aircraft while the second sound emitter 130 may be used to propagate the sound generated by the right engine of the aircraft. The present system 100 may then improve the subjective sound rendering for the user.

Referring back to FIG. 1, the first sound emitter 110 is located at a first location 107 within the environment 105. The first location 107 is a fixed position within the environment 105 and does not vary in time. In some embodiments, the position of the first sound emitter 110 is unknown while being constant in time. In some embodiments, while the position of the first sound emitter 110 is unknown, the distance between the first sound emitter 110 and the listening area 102 is known. In another embodiment, the position of the first sound emitter 110 is known and constant in time. In this case, the distance between the first sound emitter 110 and the listening area 102 is known.

The second sound emitter 130 is located at a second location 109 within the environment 105. The second position 109 is distinct from the first position 107. The second location 109 is a fixed position within the environment 105 and does not vary in time. In some embodiments, the position of the second sound emitter 130 is unknown while being constant in time. In some embodiments, while the position of the second sound emitter 130 is unknown, the distance between the second sound emitter 130 and the listening area 102 is known. In another embodiment, the position of the second sound emitter 130 is known and constant in time. The second location 109 is different from the first location 107. As a non-limiting example, the first location 107 and the second location 109 may be at different lateral sides of the environment 105. In this case, the distance between the second sound emitter 130 and the listening area 102 is known.

The first controller 115 is configured to control the first sound emitter 110 so as to emit a first audio signal which comprises a pure sinusoidal audio signal. The second controller 135 is configured to control the second sound emitter 130 so as to emit a second audio signal which comprises a noisy sinusoidal audio signal. The frequency or frequency range of the second audio signal is identical to the frequency or frequency range of the first audio signal. In some embodiments, the pure sinusoidal audio signal and the noisy sinusoidal audio signal have the same amplitude within the listening area 102. In another embodiment, the amplitude of the pure sinusoidal signal within the listening area 102 is greater than the amplitude of the noisy sinusoidal audio signal within the listening area 102. In an embodiment in which the amplitude of the pure sinusoidal audio signal within the listening area 102 is at least equal to (i.e., greater than or equal to) that of the noisy sinusoidal audio signal, the sound emitter that is capable of providing an audio signal with the greatest amplitude within the listening area 102 is selected for emitting the pure sinusoidal audio signal, i.e., the sound emitter having the greatest emission amplitude emits the pure sinusoidal audio signal while the other sound emitter(s) emit(s) the noisy sinusoidal audio signal. The noisy sinusoidal audio signal corresponds to a resonator signal and is chosen so that energy fluctuations are minimized within at least the listening area 102 of the predetermined environment 105. In this case, the second controller 135 connected to the second sound emitter 130 acts as a harmonic resonator to generate a harmonic resonator signal, i.e., it emphasizes harmonic frequency content on specified frequencies.

It will be understood that the amplitude of an audio signal within the listening area 102 refers to the amplitude of the audio signal while propagating within the listening area 102 and as perceived by a user located within the listening area 102 or measured by a sound detector located within the listening area 102. In order to determine the amplitude of the audio signals within the listening area 102, a sound detector such as a microphone may be positioned within the listening area 102 to detect the audio signals emitted by the sound emitter 110, 130 to determine their respective amplitude. In some other embodiments, the amplitude of an audio signal within the listening area 102 is estimated. For example, the amplitude of an audio signal within the listening area 102 may be estimated based on the amplitude of the audio signal as emitted, the distance between the sound emitter and the listening area 102, and optionally other factors such as obstacles present between the sound emitter and the listening area 102. In another example, the attenuation factor characterizing the attenuation of an audio signal that occurs while the audio signal propagates from its sound emitter and the listening area 102 is measured during a calibration step and the amplitude of an audio signal within the listening area 102 can be estimated based on the amplitude of the audio signal as emitted and the measured attenuation factor. In a further example, the amplitude of the audio signal within the listening area 102 may be estimated by having previously captured the transfer function between an emitted signal and a microphone temporarily installed within the listening area 102, the transfer function corresponding to the ratio of the amplitude of the measured frequencies at the microphone by the amplitude of the frequencies of the emitted signal. In still another example, in controlled environments such as listening area 102, the amplitude of the audio signal within the listening area 102 may be estimated without the use a microphone by using the emitter characteristics such as the electrical sensitivity, the frequency response and/or radiation patterns. In still another example, the amplitude of the audio signal within the listening area 102 may be estimated using the manufacturer provided emitter characteristics such as the frequency response plot and the electrical sensitivity factor of the emitter.

It will also be understood that the amplitude of an audio signal as emitted refers to the initial amplitude of the audio signal at the sound emitter, as it is being emitted by the sound emitter before it starts propagating in the environment 105.

In some embodiments, the amplitude of an audio signal emitted by a sound emitter may vary in time. In this case, the amplitudes of the pure and noisy sinusoidal audio signals within the listening area 102 is measured as a function of time by a sound detector positioned within the listening area 102 or estimated based on at least the amplitude of the pure and noisy sinusoidal audio signals as emitted and the attenuation of the pure and noisy sinusoidal audio signals that occur between the sound emitters and the listening area 102.

When the amplitude of an audio signal varies in time, the controllers 115 and 135 may be in communication and one of the controllers 115 and 135 may control the other as follows. For example, if the controller 115 acts as the main controller, i.e., if it controls the controller 135, the controller 115 is further configured for comparing the amplitude in time of the pure sinusoidal audio signal emitted by the first sound emitter 110 and the amplitude in time of the noisy sinusoidal audio signal emitted by the second sound emitter 130. If the amplitude of the pure sinusoidal audio signal remains greater than or equal to the amplitude of the noisy sinusoidal audio signal, then the first sound emitter 110 continues emitting the pure sinusoidal audio signal and the second sound emitter 130 continues emitting the noisy sinusoidal audio signal. If it determines that the amplitude of the pure sinusoidal audio signal is less than the amplitude of the noisy sinusoidal audio signal, the controller 115 inverses the emission of the signals, i.e., the pure sinusoidal audio signal is transmitted to the second controller 135 to be emitted by the second sound emitter 130 and the noisy sinusoidal audio signal is emitted by the first sound emitter 110 to ensure that the greatest amplitude signal always be the pure sinusoidal audio signal. The first audio signal then comprises the noisy sinusoidal audio signal and the second audio signal comprises the pure sinusoidal audio signal. As described in greater detail below, the transfer of the pure and noisy sinusoidal audio signals between the first and second sound emitters 110 and 130 may be gradual so that the first and second sound emitters 110 and 130 may both emit concurrently the pure and noisy sinusoidal audio signals during a given period of time.

In some embodiments, a sound detector such as a microphone is positioned within the listening area 102 to detect the pure and noisy sinusoidal audio signals and transmit the amplitude of pure and noisy sinusoidal audio signals to the first controller 115. In another embodiment, the amplitude of the pure and noisy sinusoidal audio signals within the listening area 102 is determined by the first controller 115 based on the amplitudes of the pure and noisy sinusoidal audio signals as emitted and the attenuation factors associated with the propagation of the pure and noisy sinusoidal audio signals.

In some embodiments, the monitoring of the amplitude of the pure and noisy sinusoidal audio signals is performed continuously in time. In another embodiment, the monitoring of the amplitude of the pure and noisy sinusoidal audio signals is performed in a stepwise manner, i.e., the first controller 115 receives the amplitude of the pure and noisy sinusoidal audio signals at different points spaced in time.

In some embodiments, the system 100 further comprises a third controller (not shown) configured for comparing the amplitudes of the pure and noisy sinusoidal audio signals within the listening area 102 and transferring the emission of the pure and noisy sinusoidal audio signals between the first and second sound emitters 110 and 130 when required. In this case, the third controller receives and compares the amplitudes of the pure and noisy sinusoidal audio signals and determines which one of the first and second sound emitters 110 and 130 should emit the pure sinusoidal audio signal and the noisy sinusoidal audio signal based on the comparison of the amplitudes of the pure and noisy sinusoidal audio signals. The third controller is further configured for transiting the correct audio signal to be emitted to the controllers 115 and 135 or an identification of the correct audio signal to be emitted if the first and second controllers 115 and 135 have both audio signals stored thereon. In an embodiment comprising no sound detector, the first and second sound emitters 115 and 135 are configured for transmitting the amplitude of the pure and noisy sinusoidal audio signals as emitted, respectively, to the third controller. The third controller then determines the amplitudes of the pure and noisy sinusoidal audio signals within the listening area 102 as described above before comparing the amplitudes of the pure and noisy sinusoidal audio signals within the listening area 102. In an embodiment in which a sound detector is positioned within the listening area 102, the sound detector is configured for transmitting the amplitude of the detected pure and noisy sinusoidal audio signals to the third controller.

It will be understood that in order for a transfer to happen, the controller first determines that within the listening area 102 of the predetermined environment 105, of all signals having the same given frequency as that of the pure sinusoidal signal and concurrently emitted from the first location and the second location, the one having the greatest amplitude should be emitted from the second location, and in response to the determination, control the first and the second sound emitters 110 and 130 to concurrently emit within the predetermined environment, the noisy sinusoidal audio signal from the first location and the pure sinusoidal audio signal from the second location so that within the listening area 102 of the predetermined environment 105, the pure sinusoidal audio signal emitted from the second location has an amplitude greater than any other signal having the given frequency and concurrently emitted from the first location and/or the second location.

In a further embodiment, the system 100 comprises a single controller for controlling both the first and second sound emitters 110 and 130. The single controller is configured for determining or receiving the amplitudes of the pure and noisy sinusoidal audio signals and determining which of the sound emitter 110, 130 should emit the pure sinusoidal audio signal and which of the sound emitter 110, 130 should emit the noisy sinusoidal audio signal based on the comparison of the amplitudes of pure and noisy sinusoidal audio signals within the listening area 102. As described above, the amplitude of the pure and noisy sinusoidal audio signals may be received from a sound detector positioned within the listening area 102 or determined based on the amplitudes of the pure and noisy sinusoidal audio signals as emitted and the attenuation factor for example.

In some embodiments, the first sound emitter 110 and the second sound emitter 130 are electroacoustic transducers operable to emit at least one audio signal by converting an electrical signal and/or a wireless signal. The emitted audio signal has one or more frequency, which may as a non-limiting example be between 20 Hz and 25 kHz.

In some embodiments, the first sound emitter 110 and the second sound emitter 130 correspond to speakers such as loudspeakers.

In some embodiments, a controller such as the first controller 115, the second controller 135, the third controller (not shown) or the single controller described above is a digital device which may include a processor or processing unit such as a digital signal processor (DSP), a microprocessor, and a microcontroller. Additionally, a controller may include a storage medium operatively connected to the processor which can store computer-readable instructions for implementing one or more embodiments of the present technology. As a non-limiting example, the first controller 115 and the second controller 135 may retrieve audio signals from a database stored in a memory.

When the controller is a digital device, the system further comprises digital-to-analog converters to convert electrical signal into audio signals. Referring back to the illustrated embodiment, the system 100 may further comprise a first digital-to-analog converter (not shown) connected between the first controller 115 and the first sound emitter 110 and a second digital-to-analog converter (not shown) connected between the second controller 135 and the second sound emitter 130 for converting audio signals transmitted by the first controller 115 and/or the second controller 135 from a digital form into an analog form to be played back by the first sound emitter 110 and the second sound emitter 130.

In one or more embodiments, the first controller 115 and the second controller 135 may comprise or be connected to audio signal processing components such as filters and modulators, which may be implemented via dedicated hardware and/or software.

In an embodiment in which the controllers 115 and 135 are analog controllers, each controller 115, 135 comprises a voltage-controlled oscillator (VCO) for generating a pure sinusoidal audio signal and a noise generator connected in series to a narrow band pass filter for generating a noisy sinusoidal audio signal. The system receives voltage inputs Va, Vb and Vc. The voltage input Vc is used to control the center frequency of the desired frequency for both controllers 115 and 135. The voltage inputs Va and Vb correspond to the amplitude for the controllers 115 and 135, respectively. Furthermore, an operational amplifier is used as a comparator for comparing the voltage inputs Va and Vb. When it determines that the voltage input Va is greater than the voltage input Vb, the operational amplifier transmits the voltage input Va to the VCO of the controller 115 and the voltage input Vb to the noise generator of the controller 135 as amplitude input for the band pass filter of the controller 135. When the voltage input Vb is greater than the voltage input Va, the commands are inverted and so that the operational amplifier transmits the voltage input Va to the controller 135 and the voltage input Vb as amplitude input to the band pass filter of the controller 115.

In an embodiment in which the system 100 comprises a sound detector, the sound detector comprises one or more transducers and is operable to detect audio waves emitted by inter alia the first sound emitter 110 and the second sound emitter 130 and generate one or more detected audio signals. The sound detector is further configured for transmitting the detected audio signals to a controller.

In some embodiments, the sound detector comprises a microphone such as a condenser microphone or a dynamic microphone, and may be omnidirectional, bi-directional, cardioid, hyper cardioid, and super cardioid.

In some embodiments, the sound detector comprises a signal processor configured for processing the detected audio signals and transmitting the detected audio signals or commands to the first controller 115 and/or the second controller 135. For example, the signal processor may be configured for determining the amplitude of the detected audio signals within the listening area 102 and transmitting the determined amplitude for each detected audio signal to the controllers 115 and 135.

In some embodiments, the sound detector comprises an analog-to-digital converter (ADC) for converting the detected audio signals from an analog form into a digital form.

In some embodiments, the sound detector is operable to detect and/or determine: amplitude variations between audio signals, frequency variations between audio signals, directionality of audio signals, constructive and destructive interference of audio signals, and/or the like.

In some embodiments, the first sound emitter 110 and/or the second sound emitter 130 act as a resonator by: (i) obtaining/receiving a noisy signal; and (ii) filtering the noisy signal using a band-pass filter to obtain a noisy sinusoidal signal. The first sound emitter 110 and/or second sound emitter may use a band-pass filter having a bandwidth such that: the filtered signal is approximately sinusoidal, i.e., a noisy sinusoidal signal, and a phase incoherence is upheld, i.e., a difference between the phase of the filtered signal and the phase of the pure sinusoidal signal varies in time.

In some embodiments, the difference between the phase of the pure sinusoidal audio signal and the phase of the noisy sinusoidal audio signal is chosen to be within a predetermined range.

In some embodiments, the phase of the pure sinusoidal audio signal is continuously different from the phase of the noisy sinusoidal audio signal, i.e., at point in time during the emission of the pure sinusoidal audio and noisy sinusoidal audio signals, the phase of the pure sinusoidal audio signal is different from that of the noisy sinusoidal audio signal.

In other embodiment, the phase of the pure sinusoidal audio signal is different from that of the noisy sinusoidal audio signal at at least some points in time during the emission of the pure sinusoidal audio and noisy sinusoidal audio signals.

In some embodiments, a bandwidth of the band-pass filter is determined empirically. In one or more embodiments, the bandwidth is within a range and/or selected based on a predetermined threshold.

In some embodiments, the noisy signal is a white noise, i.e., a random signal having equal intensity at different frequencies, giving it a constant power spectral density. However, it will be understood that other types of noisy signals may be processed by the first sound emitter 110 and/or the second sound emitter 130, such as pink noise, brown noise, grey noise or the like.

In some embodiments, the type of noisy signal to be used (e.g., white noise, pink noise, brown noise, etc.) is chosen based on characteristics of the pure sinusoidal signal. For example, in some embodiments in which the pure sinusoidal signal is a low-frequency signal, a brown noise signal may be used as noisy signal. In some other embodiments in which the pure sinusoidal signal is a high-frequency signal, a white noise signal may be used as noisy signal.

In some embodiments, the noisy signal is filtered using a substantially narrow filter to keep only some frequencies near the pure sinusoidal frequency and obtain a filtered noisy signal such as a filtered brown noise signal or a filtered white noise signal.

In some embodiments, the controller 115 connected to the first sound emitter 110 and/or the controller 135 connected to the second sound emitter 130 act as a resonator by dynamically adjusting a bandwidth of a band-pass filter based on a central frequency of the resonator audio signal and a central frequency of the pure sinusoidal signal in order to emit a noisy sinusoidal audio signal.

The dynamic adjustment of the bandwidth may be executed in real-time. In one or more embodiments, the sound detector may detect frequencies of audio signals and provide feedback to the first controller 115 and/or the second controller 135 to dynamically adjust a bandwidth of a filter.

In some embodiments and as described above, the emission of the pure sinusoidal audio signal and the noisy sinusoidal audio signal may be transferred between the first and second sound emitters when the identification of the sound emitter having the greatest emission amplitude changes. It will be understood that the transfer may be performed based on a predetermined amplitude threshold or hysteresis function. In some embodiments, the transfer may be executed based on a predetermined threshold, such as an amplitude difference above 1.5 dB. In another embodiment, the predetermined threshold may be a relative threshold. For example, the transfer may be performed when the amplitude of the noisy signal is equal to or above ×1.15 the amplitude of the pure sinusoidal signal.

In some embodiments, the concurrent transfer of the pure sinusoidal audio signal and the noisy sinusoidal audio signal between the first and second sound emitters 110 and 130 is performed gradually in time by the first controller 115 and the second controller 135 so as to obtain a transitory phase comprising a fading out of the pure sinusoidal audio signal and a fading in of the noisy sinusoidal audio signal at the first sound emitter 110, and a fading in of the pure sinusoidal audio signal and a fading out of the noisy sinusoidal audio signal at the second sound emitter 130. Once the transfer completed, the first audio signal comprises the noisy sinusoidal audio signal and the second audio signal comprises the pure sinusoidal audio signal. The gradual transfer may be performed in a linear or exponential manner during a predefined period of time. During the predefined period of time, i.e., during the transitory phase, the first audio signal comprises both the pure and noisy sinusoidal audio signals and the second audio signal also comprises both the pure and noisy sinusoidal audio signals.

In some embodiments, a noisy sinusoidal audio signal may be generated as follows. In this case, the first sound emitter 110 and/or the second sound emitter 130 act as a resonator by: (i) generating a plurality of sinusoidal audio signals; and (ii) combining the plurality of sinusoidal audio signals to obtain the noisy sinusoidal audio signal.

Figure 3A:
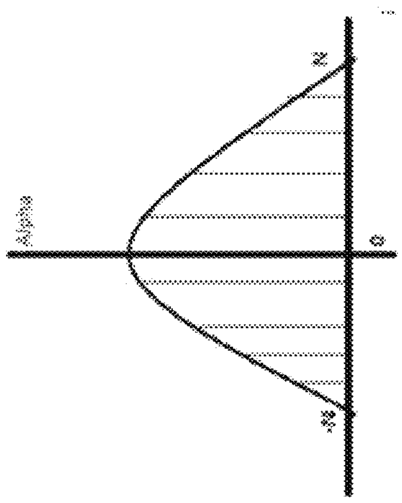
FIG. 3A illustrates a plot of a resonator audio signal in the spectral domain where the amplitude is shown as function of the frequency, in accordance with one or more non-limiting embodiments of the present technology.

The system 100 may be configured such that the frequency response of the noisy sinusoidal audio signal is reproduced by generating a plurality of audio signals, which is shown in FIG. 3A. The noisy sinusoidal signal may be expressed as equations (1-2):

$$R(f) = \sum_{i=-N}^{N} \alpha_i \delta(f - f_c + i\Delta f) \tag{1}$$

$$\theta(f) = rand(-\pi, \pi) \tag{2}$$

where R(f) is the magnitude (radius) of the frequency f, θ(f) is the angle (radian) of the frequency, $\alpha_i$ is the amplitude which has typically the highest value at $\alpha_0$ and decaying for each side of 0. Once the values are set, users can shuffle values so that more randomness is added in the spectrum. δ is the Dirac delta function, $f_c$ is the center frequency of the generator, Δf is the frequency increment which can be constant for all f, or random, N is the number of frequency bin to add to each side of $f_c$, $$N = \frac{B}{2\Delta f}$$

rand(x, y) is a random generator function generally with a normal distribution that output a value between x an y.

Various techniques known in the art may be used for converting signals from the spectral domain to the temporal domain, such as discrete Fourier transforms (DFT) and fast Fourier transforms (FFT).

In one or more embodiments, the bandwidth may be in the range of 2 Hz.

In one or more embodiments, the bandwidth is equal or lesser than the frequency of the resonator filter, which may be expressed as equation (3):

$$B(f_c) \leq 2f_c \tag{3}$$

where $B(f_c)$ is the bandwidth and $f_c$ is the frequency of the resonator filter.

Figure 3B:
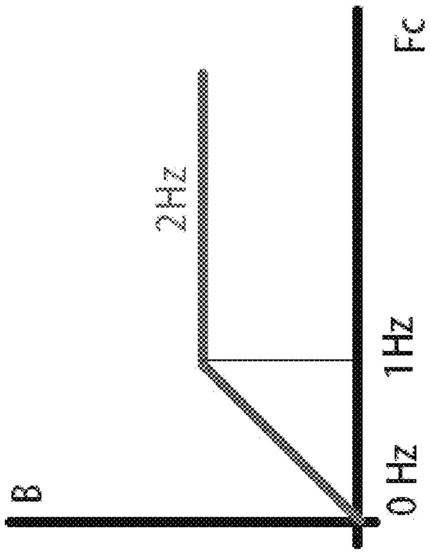
FIG. 3B illustrates a plot of a configuration of a bandwidth of a filter where the bandwidth is expressed as a function of the frequency, in accordance with one or more non-limiting embodiments of the present technology.

As a non-limiting example, a configuration of the bandwidth of the filter, of which an example is illustrated in FIG. 3B, may be expressed as equations (4-5):

$$\text{If } (f_c < 1)\text{: } B(f_c) = 2f_c \tag{4}$$

$$\text{Else: } B(f_c) = 2 \text{ Hz} \tag{5}$$

In some embodiments, when the environment 105 is a flight simulator, the bandwidth may be set as a function of the flight simulator output. As a non-limiting example, it may be configured as a function of the engines speed $B(s_{engine})$, but where the output does not exceed the configuration specified by equations (4-5). Any adequate function could be possible, such as a polynomial function or a step function. As a non-limiting example, it may be expressed as equation (6):

$$B(s_{engine}) \leq 2f_c \tag{6}$$

This allows to modify the subjective output of the filter in a static scenario. Another possibility is to dynamically changes the output of the filter throughout the transitions, in which case the function may be based on a rate of change of the engine speed or engine acceleration $s'_{engine}$, where $B(s_{engine})$ is a differentiable function, and where the configuration of the filter is expressed as equation (7):

$$B(s_{engine}, s'_{engine}) \leq 2f_c \tag{7}$$

where $B(f_c)$ is the bandwidth and $f_c$ is the frequency of the resonator filter.

Figure 2A:
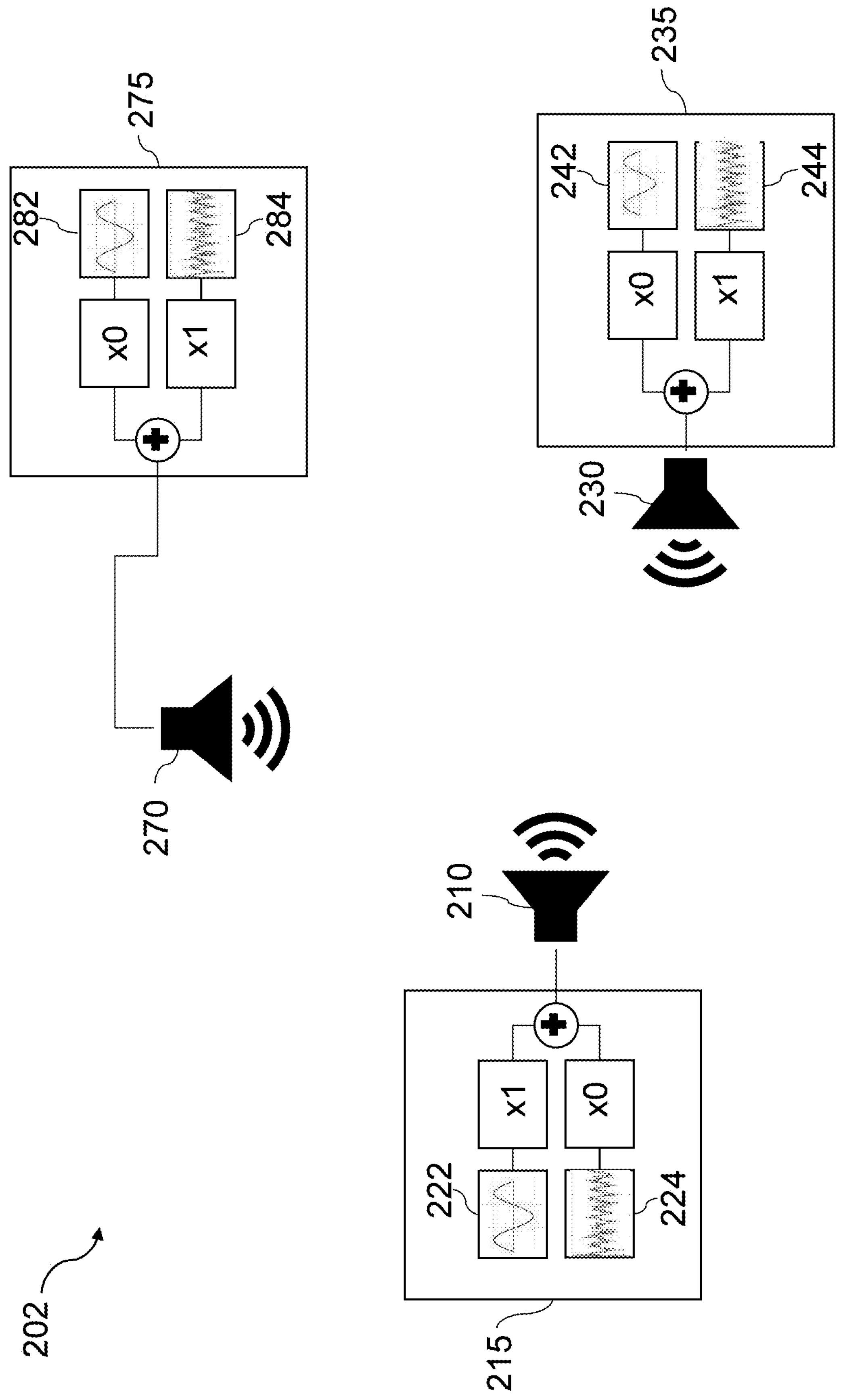
FIGS. 2A, 2B, and 2C illustrate a schematic diagram of a transfer of sound emission at three different times within a system, in accordance with one or more non-limiting embodiments of the present technology.
Figure 2B:
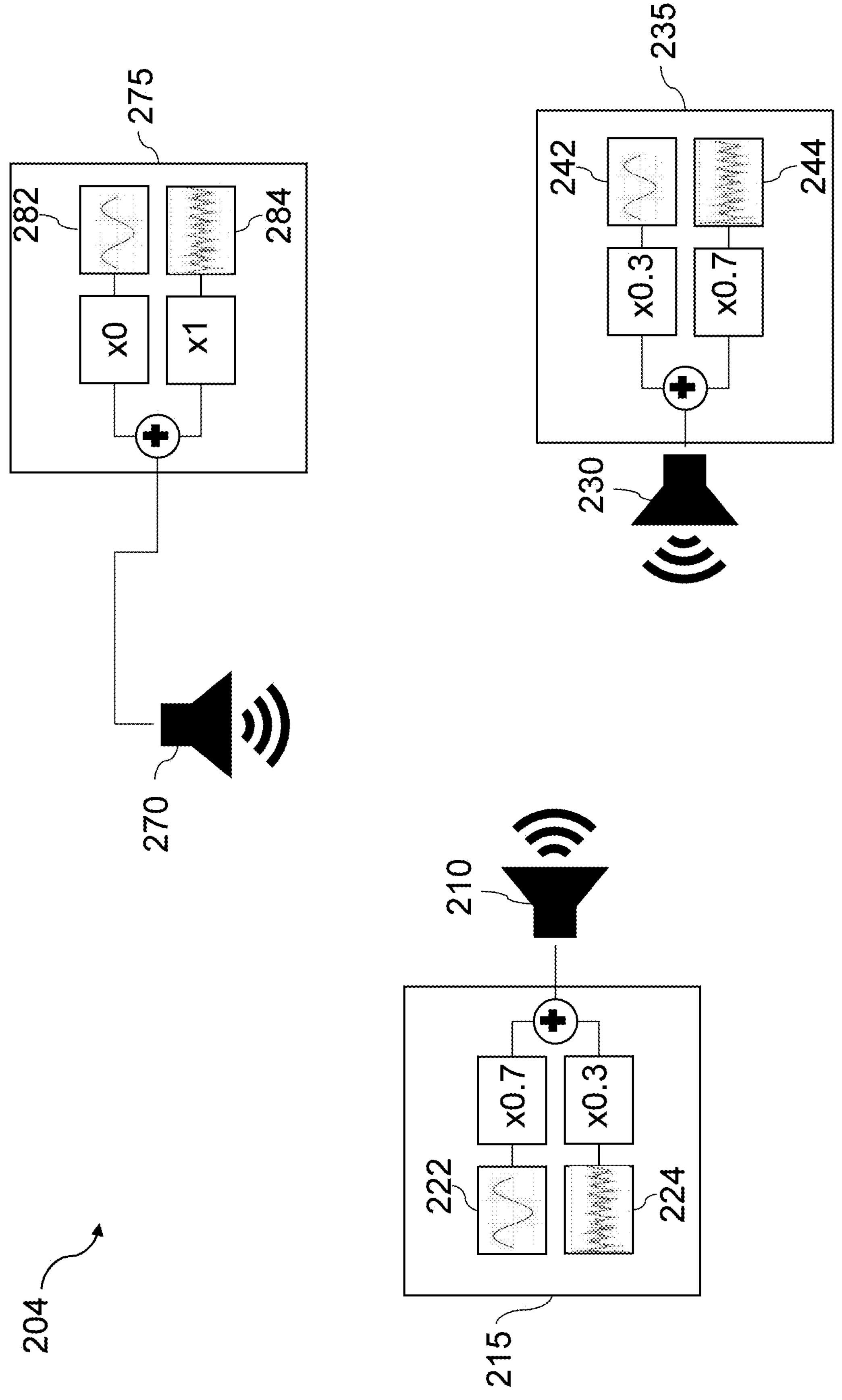
Figure 2C:
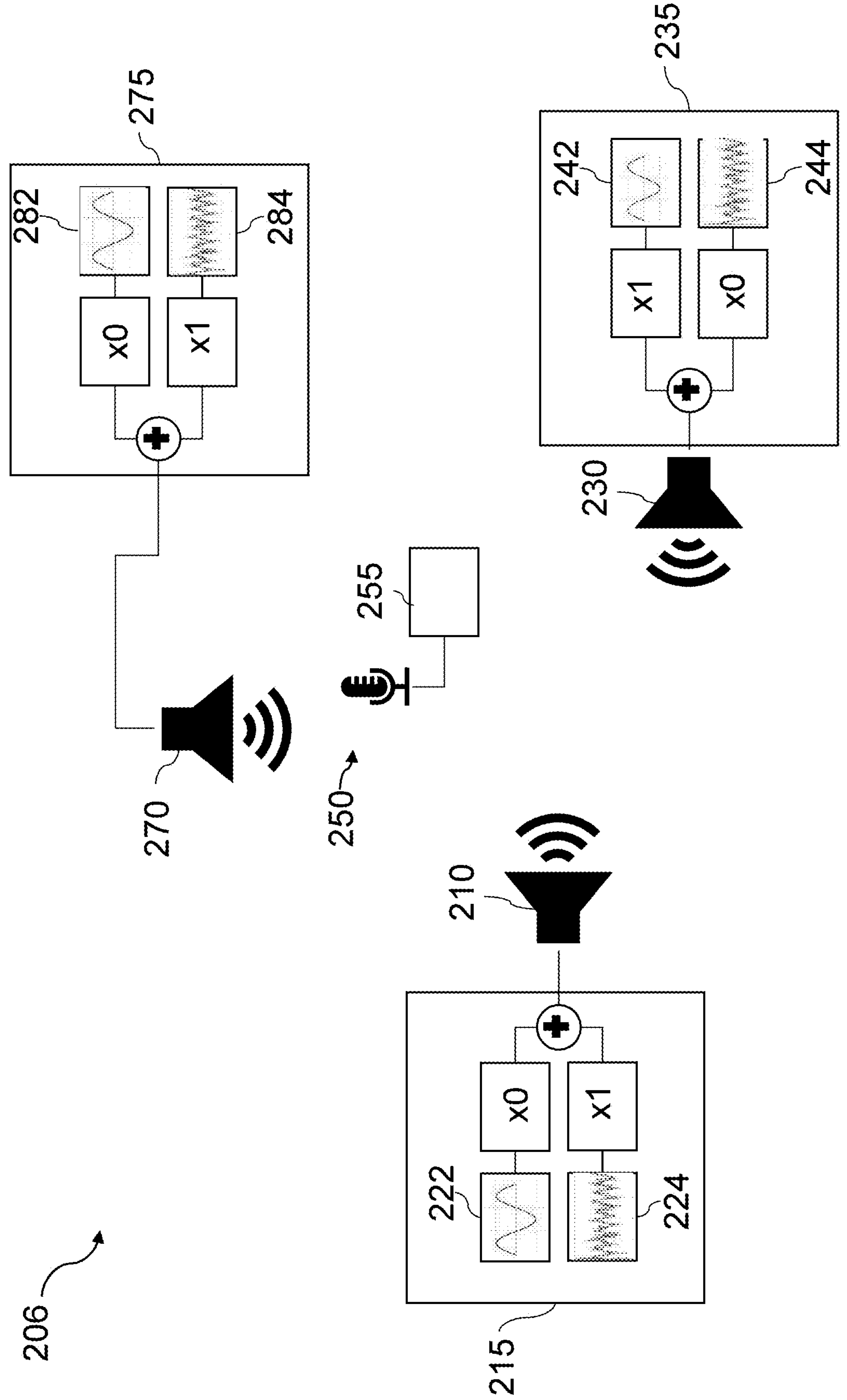

Referring now to FIG. 2A, FIG. 2B and FIG. 2C, there is schematically illustrated an exemplary system configured to perform an emission transfer of audio signals between three sound emitters at three different points in time 202, 204 and 206.

In the illustrated embodiment, the system comprises a first sound emitter 210 operatively connected to a first controller 215, a second sound emitter 230 operatively connected to a second controller 235, and a third sound emitter 270 is operatively connected to a third controller 275. The system may further comprise a main controller for controlling the first, second, and third controller 215, 235 and 275 and/or a sound detector.

The sound emitters 210, 230, 270 may be similar to the sound emitters 110, 130 shown in FIG. 1 and the controllers 215, 235, 275 may be similar to the controllers 115, 135 shown in FIG. 1.

The controllers 215, 235 and 275 may have communication interfaces and may be communicatively coupled for transmitting audio signals and commands.

It will be appreciated that one or more of the first controller 215, the second controller 235 and the third controller 275 can be implemented in a single device. Each of the first controller 215, the second controller 235, and the third controller 275 are operable to cause emission of pure sinusoidal audio signals and noisy audio signals by the first sound emitter 210, the second sound emitter 230, and the third sound emitter 270. As a non-limiting example, each of the first controller 215, the second controller 235, and the third controller 275 may have a pure sinusoidal function or component, and a noisy signal function or component. The first controller 215, the second controller 235, and the third controller 275 may implement a band-pass filter as a hardware or software component for controlling emission of a noisy sinusoidal audio signal and/or pure sinusoidal signal. In one or more alternative embodiments, the first controller 215, the second controller 235, and the third controller 275 may generate a noisy sinusoidal audio signal by combining a plurality of sinusoidal signals.

At $t_0$ or an initial point in time 202, the first sound emitter 210 emits a first audio signal which corresponds to a pure sinusoidal audio signal only. In some embodiments, the first controller 215 causes the first sound emitter 210 to emit the pure sinusoidal audio signal via activation of the pure signal function 222, while the noisy signal function 224 is not activated. As a non-limiting example, the initial moment in time 202 simulates a sound of a left motor in a flight simulator.

At the initial point in time 202, the second sound emitter 230 concurrently emits a second audio signal and the third sound emitter 270 concurrently emits a third audio signal. The second audio signal comprises a first noisy sinusoidal audio signal only, and the third audio signal comprises a second noisy sinusoidal audio signal only. In some embodiments, the first and second noisy sinusoidal audio signals are identical. In another embodiment, the first and second noisy sinusoidal audio signals are different.

In some embodiments, the second controller 235 causes the second sound emitter 230 to emit the first noisy sinusoidal audio signal via activation of the noisy signal function 244 while the pure signal function 242 is not activated. Similarly, the third controller 275 causes the third sound emitter 270 to emit the second noisy sinusoidal audio signal via activation of the noisy signal function 284 while the pure signal function 282 is not activated.

The amplitude of the emitted audio signals is monitored as described above. For example, a sound detector may detect the first, second and third audio signals. In some embodiments, the sound detector continuously monitors the audio signal and a signal processor of the audio detector transmits data to the first controller 215, the second controller 235 and the third controller 275 such that a phase incoherence between the audio signals is upheld, audio uniformity is upheld and thus energy fluctuations are minimized within at least a portion of the environment of the simulator. In another example, the amplitudes of the audio signals are estimated as described above.

At a given point in time comprised between $t_0$ and $t_1$, it is determined that the amplitude of the first noisy sinusoidal audio signal within the listening area emitted by the second sound emitter 230 becomes greater than the amplitude of the pure sinusoidal audio signal within the listening area emitted by the first sound emitter 210. A transfer of the emission of the pure sinusoidal audio signal from the first sound emitter 210 to the second sound emitter 230 and a concurrent transfer of the noisy sinusoidal audio signal from the second sound emitter 230 to the first sound emitter 210 start.

The first controller 215 performs a fading out and lowers the amplitude of the pure signal function 222, and performs a fading in by activating the noisy signal function 224 to cause the emission of the first audio signal that now comprises a combination of a pure sinusoidal audio signal and a noisy sinusoidal audio signal.

The second controller 235 concurrently performs a fading out by lowering the amplitude of the noisy signal function 244 and performs a fading in by activating the pure signal function 242 to cause the emission of the second audio signal that now comprises a combination of a pure sinusoidal audio signal and a noisy sinusoidal audio signal.

The third controller 275 causes the third sound emitter 270 to maintain emission of the third signal that still comprises the second noisy sinusoidal audio signal.

FIG. 2B illustrates the emission of the first, second and third audio signals by the first, second and third sound emitters 210, 230 and 270, respectively, during the emission transfer at time $t_1$. At this point in time, the first sound emitter 210 emits the first audio signal which comprises 70% of the pure sinusoidal audio signal and 30% of the noisy sinusoidal audio signal. The second sound emitter 230 the second audio signal which comprises 30% of the pure sinusoidal audio signal and 70% of the noisy sinusoidal audio signal. The third sound emitter 270 continues to emit the same noisy sinusoidal audio signal.

FIG. 2C illustrates the emission of the first, second, and third audio signals by the first, second, and third sound emitters 210, 230 and 270, respectively, when the emission transfer is completed at time $t_2$. The first controller 215 then deactivates the pure signal function 222 so that the first sound emitter 210 only emits the first noisy sinusoidal audio signal that the second sound emitter 230 emitted at time $t_0$. The second controller 235 deactivates the noisy signal function 244 so that the second sound emitter 230 only emits the pure sinusoidal audio signal that the first sound emitter 230 emitted at time $t_0$. The third sound emitter 270 continues to emit the second noisy sinusoidal audio signal.

Figure 4:
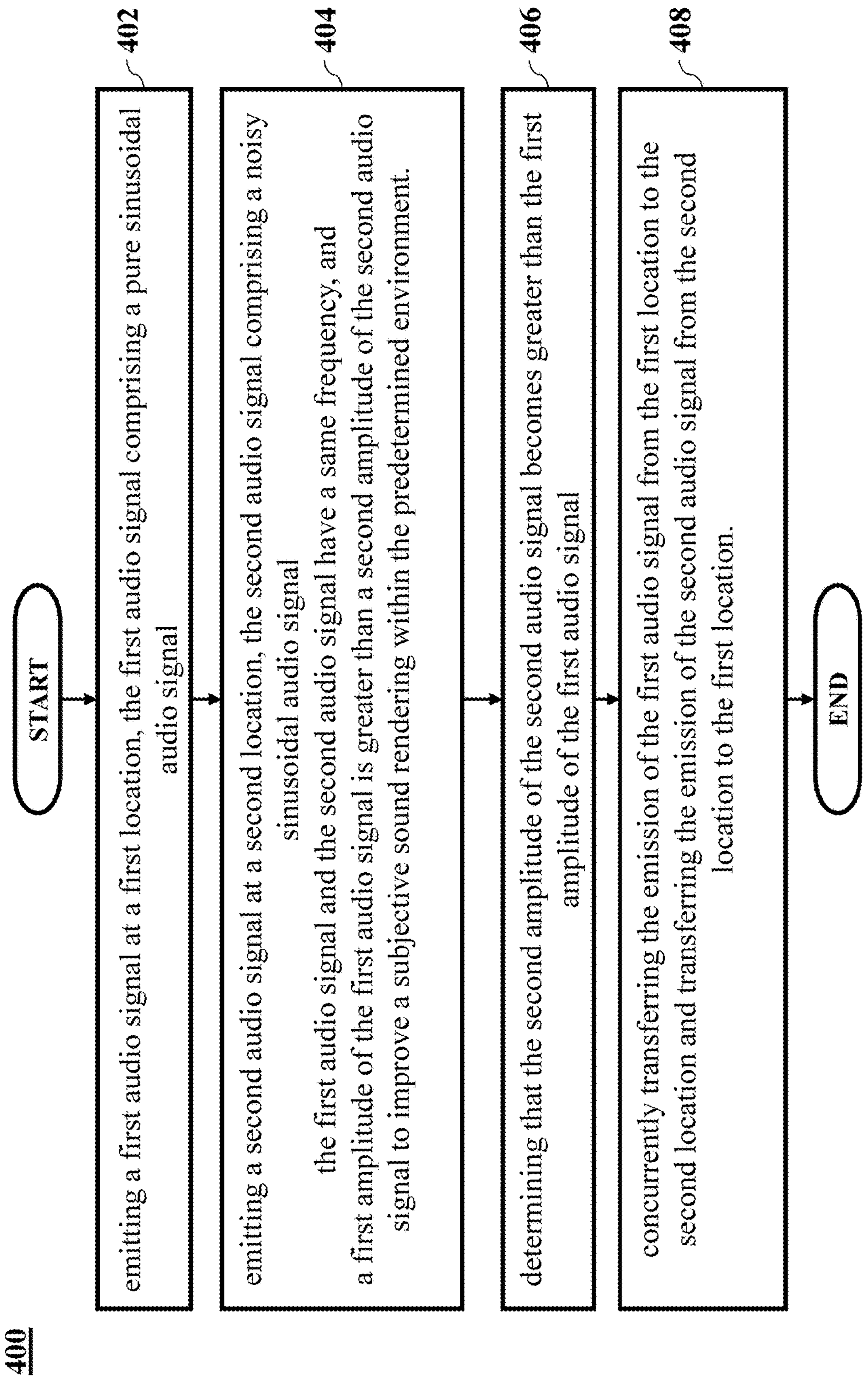
FIG. 4 illustrates a flowchart of a method for improving subjective sound rendering within a predetermined environment, in accordance with one or more non-limiting embodiments of the present technology.

FIG. 4 illustrates one embodiment of a method 400 for improving subjective sound rendering within a listening area of a predetermined environment.

The method 400 may be executed within an environment such as, but not limited to a vehicle simulator.

At step 402, a first audio signal is emitted at a first location, the first audio signal comprising a pure sinusoidal audio signal.

At step 404, a second audio signal is emitted at a second location concurrently with the emission of the first audio signal so that steps 402 and 404 are performed concurrently. The second audio signal comprises a noisy sinusoidal audio signal. The second location from which the second audio signal is emitted is distinct form the first location from which the first audio signal is emitted.

The second audio signal is a resonator signal, which enables maintaining uniformity and minimizing sound fluctuations caused by the audio signals within at least a portion of an environment.

The pure and noisy sinusoidal audio signals are chosen so to have the same frequency or frequency range. The amplitude of the noisy sinusoidal audio signal within the listening area is less than or equal to the amplitude of the pure sinusoidal audio signal within the listening area. As described above, the amplitude of an audio signal within the listening area may be measured using a sound detector or estimated.

In some embodiments, the noisy sinusoidal audio signal is generated by filtering a noisy signal to obtain the second audio signal, as described above.

In another embodiment, the noisy sinusoidal audio signal is obtained by generating a plurality of sinusoidal audio signals and combining the plurality of sinusoidal audio signals to obtain the second audio signal, as described above.

The amplitudes of the pure and noisy sinusoidal audio signals are monitored in time either continuously or in a stepwise manner. The amplitudes of the pure and noisy sinusoidal audio signals are compared so as to determine which audio signal has the greatest amplitude. If the amplitude of pure sinusoidal audio signal within the listening area remains at least equal to that of the noisy sinusoidal audio signal, then the pure sinusoidal audio signal continues being emitted from the first location and the noisy sinusoidal audio signal continues being emitted from the second location.

Otherwise, if it is determined that the amplitude of the noisy sinusoidal audio signal within the listening area becomes greater than the amplitude of the pure sinusoidal audio signal within the listening area at step 406, a transfer of the signal emission occurs between the first and second locations at step 408.

In some embodiments, the transfer only occurs when the amplitude of the second audio signal is greater than the amplitude of the first audio signal plus a predetermined threshold. As described above, the predetermined threshold may be an absolute threshold or a relative threshold.

At step 408, the emission of the pure sinusoidal audio signal is transferred from the first location to the second location and the emission of the noisy sinusoidal audio signal is concurrently transferred from the second location to the first location. In some embodiments, the transfer of the emission of the pure sinusoidal audio signal and the transfer of the emission of the noisy sinusoidal audio signal are performed gradually in time so as to obtain a transitory phase which comprises a fading out of the pure sinusoidal audio signal and a fading in of the noisy sinusoidal audio signal at the first location, and a fading in of the pure sinusoidal audio signal and a fading out of the noisy sinusoidal audio signal at the second location. As a result of the transfer, the pure sinusoidal audio signal is now emitted from the second location and the noisy sinusoidal audio signal is emitted from the first location.

It will be appreciated that a time length of the transfer may be predetermined.

Figure 5:
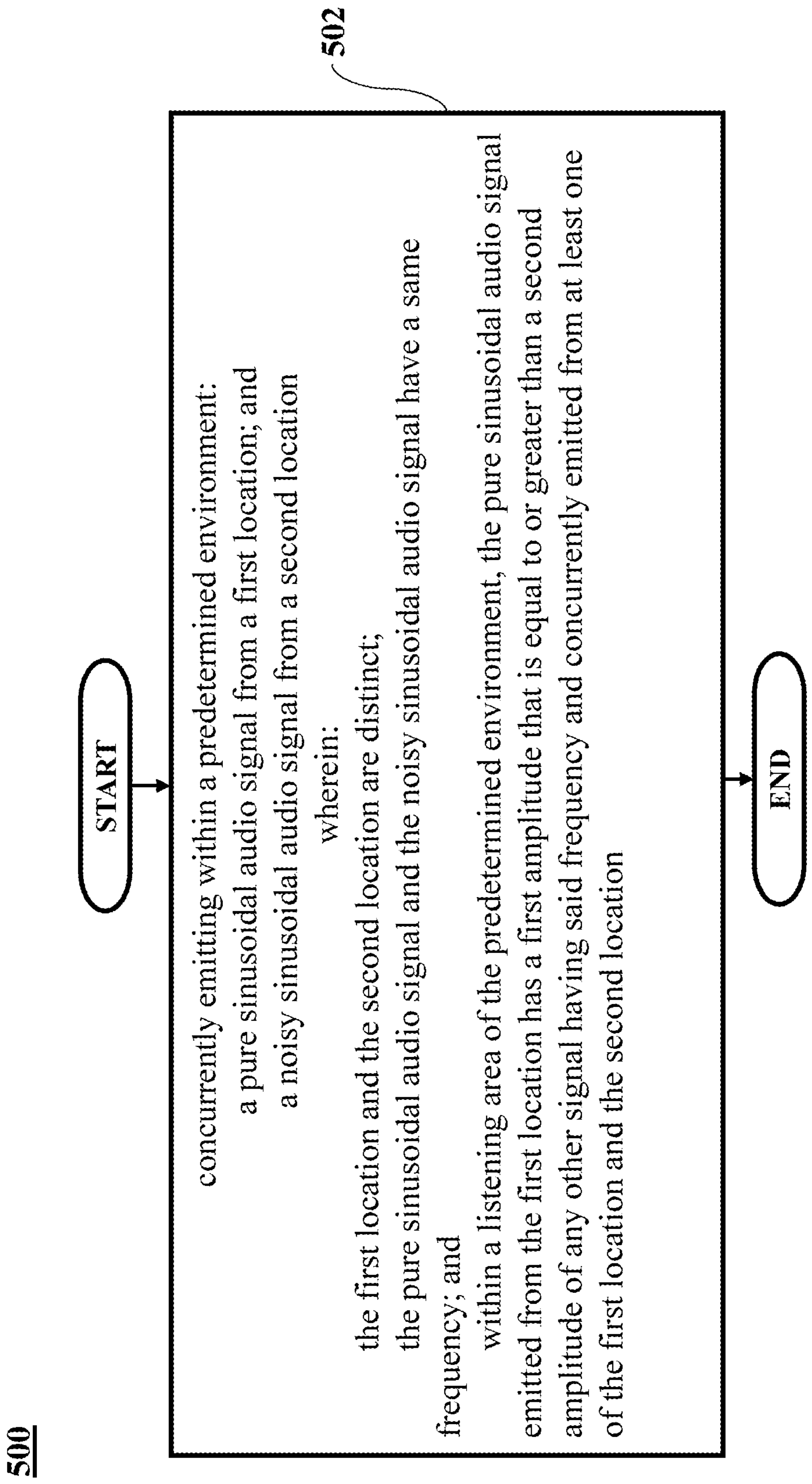
FIG. 5 illustrates a flowchart of a method for generating sound within a predetermined environment, in accordance with one or more non-limiting embodiments of the present technology.

FIG. 5 illustrates one embodiment of a method 500 for generating sound within a predetermined environment. The method 500 comprises a step 502 of concurrently emitting, within the predetermined environment, a pure sinusoidal audio signal from a first location; and a noisy sinusoidal audio signal from a second location. The first location and the second location are distinct. The pure sinusoidal audio signal and the noisy sinusoidal audio signal have a same frequency. Within a listening area of the predetermined environment, the pure sinusoidal audio signal emitted from the first location has a first amplitude that is equal to or greater than a second amplitude of any other signal having said frequency and concurrently emitted from at least one of the first location and the second location. In at least some embodiments, the method 500 allows for improving subjective sound rendering within the listening area of the predetermined environment.

In some embodiments, the step 502 of emitting the second audio signal comprises filtering a noisy signal to obtain the noisy sinusoidal audio signal. In this case, the phase of the noisy sinusoidal audio signal is different from the phase of the pure sinusoidal audio signal. The filtering step may act as a harmonic resonator having a resonating frequency.

In some embodiments, the filtering step is performed using a band-pass filter. The band-pass filter may have a predetermined bandwidth, and the predetermined bandwidth may be sufficiently large to preserve a phase incoherence between the pure sinusoidal audio signal and the noisy sinusoidal audio signal. In some embodiments, the predetermined bandwidth is about 2 Hz.

In some embodiments, the noisy signal comprises at least one of white noise, pink noise, red noise, brown noise and grey noise.

In some embodiments, the difference between the phase of the pure sinusoidal audio signal and the phase of the noisy sinusoidal audio signal is chosen to be within a predetermined range.

In some embodiments, the step 502 of emitting the noisy sinusoidal audio signal comprises: generating a plurality of sinusoidal audio signals; and combining the plurality of sinusoidal audio signals to obtain the second audio signal.

In some embodiments, the method 500 further comprises:

determining that within the listening area of the predetermined environment, amongst all signals having the same frequency and being concurrently emitted from the first location and the second location, the one having the greatest amplitude should be emitted from the second location; and in response, concurrently emitting within the predetermined environment: the noisy sinusoidal audio signal from the first location, and the pure sinusoidal audio signal from the second location. In this case, within the listening area of the predetermined environment, the pure sinusoidal audio signal emitted from the second location has a greater amplitude than any other signal having the same frequency and being concurrently emitted from at least one of the first location and the second location.

In some embodiments, a transfer of the emission of the pure sinusoidal audio signal from the first location to the second location and a transfer of the emission of the noisy sinusoidal audio signal from the second location to the first location are performed gradually in time so as to obtain a transitory phase which comprises a fading out of the pure sinusoidal audio signal and a fading in of the noisy sinusoidal audio signal, at the first location, and a fading in of the pure sinusoidal audio signal and a fading out of the noisy sinusoidal audio signal, at the second location.

In some embodiments, the transfer of the emission of the pure sinusoidal audio signal and the transfer of the emission of the noisy sinusoidal audio signal are performed in an exponential manner.

In some embodiments, the method 500 further comprises estimating the amplitude of the pure sinusoidal audio signal within the listening area and the amplitude of the noisy sinusoidal audio signal within the listening area.

It will be appreciated that the method (400, 500) may be executed for any number of sound emitters, and any location of the sound emitters.

In some embodiments, a non-transitory computer program product may include a computer readable memory storing computer executable instructions that when executed by a processor cause the processor to execute the method (400, 500). The processor may be included in a computer for example, which may load the instructions in a random-access memory for execution thereof.

The one or more embodiments of the technology described above are intended to be exemplary only. The scope of the technology is therefore intended to be limited solely by the scope of the appended claims.

We claim:

1. A method for generating sound within a predetermined environment, the method comprising:

concurrently emitting within the predetermined environment:

a pure sinusoidal audio signal from a first location; and a noisy sinusoidal audio signal from a second location, wherein:

the first location and the second location are distinct;

the pure sinusoidal audio signal and the noisy sinusoidal audio signal have a same frequency; and within a listening area of the predetermined environment, the pure sinusoidal audio signal emitted from the first location has a first amplitude that is equal to or greater than a second amplitude of any other signal having said frequency and concurrently emitted from at least one of the first location and the second location, the method further comprising:

determining that within the listening area of the predetermined environment, of all signals having said frequency and concurrently emitted from the first location and the second location, a given one of said all signals having the greatest amplitude is emitted from the second location; and in response to the determining, concurrently emitting within the predetermined environment:

the noisy sinusoidal audio signal from the first location; and the pure sinusoidal audio signal from the second location, wherein within the listening area of the predetermined environment, the pure sinusoidal audio signal emitted from the second location has a greater amplitude than any other signal having said frequency and concurrently emitted from at least one of the first location and the second location.

2. The method of claim 1, wherein said emitting the noisy sinusoidal audio signal comprises filtering a noisy signal to obtain the noisy sinusoidal audio signal, a first phase of the noisy sinusoidal audio signal being different from a second phase of the pure sinusoidal audio signal.

3. The method of claim 2, wherein the filtering of the noisy signal acts as a harmonic resonator having a resonating frequency.

4. The method of claim 2, wherein the noisy signal comprises at least one of white noise, pink noise, red noise, brown noise and grey noise.

5. The method of claim 1, wherein said emitting the noisy sinusoidal audio signal comprises:

generating a plurality of sinusoidal audio signals; and combining the plurality of sinusoidal audio signals to obtain the noisy sinusoidal audio signal.

6. The method of claim 1, wherein a transfer of the emission of the pure sinusoidal audio signal from the first location to the second location and a transfer of the emission of the noisy sinusoidal audio signal from the second location to the first location are performed gradually in time so as to obtain a transitory phase comprising:

a fading out of the pure sinusoidal audio signal and a fading in of the noisy sinusoidal audio signal, at the first location; and a fading in of the pure sinusoidal audio signal and a fading out of the noisy sinusoidal audio signal, at the second location.

7. The method of claim 1, further comprising estimating the amplitude of the pure sinusoidal audio signal within the listening area and the amplitude of the noisy sinusoidal audio signal within the listening area.

8. A system for generating sound within a predetermined environment, the system comprising:

at least one processor; and a non-transitory computer program product comprising a storage medium storing computer executable instructions thereon that when executed by the at least one processor cause the at least one processor to:

control a first emitter located at a first location for emitting a pure sinusoidal audio signal; and control a second emitter located at a second location for emitting a noisy sinusoidal audio signal, wherein:

the first location and the second location are distinct;

the pure sinusoidal audio signal and the noisy sinusoidal audio signal have a same frequency; and within a listening area of the predetermined environment, the pure sinusoidal audio signal emitted from the first location has a first amplitude that is equal to or greater than a second amplitude of any other signal having said frequency and concurrently emitted from at least one of the first location and the second location, wherein the storage medium stores further computer executable instructions thereon that when executed by the at least one processor cause the at least one processor to:

determine that within the listening area of the predetermined environment, of all signals having said frequency and concurrently emitted from the first location and the second location, a given one of said all signals having the greatest amplitude is emitted from the second location; and in response to the determination, concurrently control the first and second emitters for emitting within the predetermined environment:

the noisy sinusoidal audio signal from the first location, and the pure sinusoidal audio signal from the second location, wherein within the listening area of the predetermined environment, the pure sinusoidal audio signal emitted from the second location has a greater amplitude than any other signal having said frequency and concurrently emitted from at least one of the first location and the second location.

9. The system of claim 8, wherein the storage medium stores further computer executable instructions thereon that when executed by the at least one processor cause the at least one processor to:

generate a noisy signal;

filter the noisy signal to obtain the noisy sinusoidal audio signal, a phase of the noisy sinusoidal audio signal being different from a phase of the pure sinusoidal audio signal; and transmit the noisy sinusoidal audio signal to the second emitter.

10. The system of claim 9, wherein a difference between the phase of the pure sinusoidal audio signal and the phase of the noisy sinusoidal audio signal is chosen to be within a predetermined range.

11. The system of claim 9, wherein the noisy signal comprises at least one of white noise, pink noise, red noise, brown noise and grey noise.

12. The system of claim 9, wherein the storage medium stores additional computer executable instructions thereon that when executed by the at least one processor cause the at least one processor to filter the noisy signal using a band-pass filter.

13. The system of claim 12, wherein the band-pass filter has a predetermined bandwidth and the predetermined bandwidth is sufficiently large to preserve a phase incoherence between the pure sinusoidal audio signal and the noisy sinusoidal audio signal.

14. The system of claim 8, wherein the storage medium stores further computer executable instructions thereon that when executed by the at least one processor cause the at least one processor to:

generate a plurality of sinusoidal audio signals;

combine the plurality of sinusoidal audio signals to obtain the noisy sinusoidal audio signal; and transmit the noisy sinusoidal audio signal to the second emitter.

15. The system of claim 8, wherein the storage medium stores further computer executable instructions thereon that when executed by the at least one processor cause the at least one processor to perform a transfer of the emission of the pure sinusoidal audio signal from the first emitter to the second emitter and a transfer of the emission of the noisy sinusoidal audio signal from the second emitter to the first emitter gradually in time so as to obtain a transitory phase comprising:

a fading out of the pure sinusoidal audio signal and a fading in of the noisy sinusoidal audio signal at the first location; and a fading in of the pure sinusoidal audio signal and a fading out of the noisy sinusoidal audio signal at the second location.

16. The system of claim 15, wherein the transfer of the emission of the pure sinusoidal audio signal and the transfer of the emission of the noisy sinusoidal audio signal are performed in an exponential manner.

17. The system of claim 8, wherein the storage medium stores supplementary computer executable instructions thereon that when executed by the at least one processor cause the at least one processor to estimate the amplitude of the pure sinusoidal audio signal within the listening area and the amplitude of noisy sinusoidal audio signal within the listening area.

18. A non-transitory computer program product for generating sound within a predetermined environment, the non-transitory computer program product comprising a storage medium storing computer executable instructions thereon that when executed by a processor cause the processor to:

control a first emitter located at a first location for emitting a pure sinusoidal audio signal; and control a second emitter located at a second location for emitting a noisy sinusoidal audio signal, wherein:

the first location and the second location are distinct;

the pure sinusoidal audio signal and the noisy sinusoidal audio signal have a same frequency; and within a listening area of the predetermined environment, the pure sinusoidal audio signal emitted from the first location has a first amplitude that is equal to or greater than a second amplitude of any other signal having said frequency and concurrently emitted from at least one of the first location and the second location, determine that within the listening are f the predetermined environment, of all signals having said frequency and concurrently emitted from the first location and the second location, a given one of said all signals having the greatest amplitude is emitted from the second location; and in response to the determining, concurrently emitting within the predetermined environment:

the noisy sinusoidal audio signal from the first location, and the pure sinusoidal audio signal from the second location, wherein within the listening area of the predetermined environment, the pure sinusoidal audio signal emitted from the second location has a greater amplitude than any other signal having said frequency and concurrently emitted from at least one of the first location and the second location.

* * * * *